(12) United States Patent
Kwon et al.

(10) Patent No.: US 8,931,104 B2
(45) Date of Patent: Jan. 6, 2015

(54) DIGITAL RIGHTS MANAGEMENT METHOD AND APPARATUS

(75) Inventors: Won-Seok Kwon, Suwon-si (KR); Hyoung-Shick Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 938 days.

(21) Appl. No.: 12/036,311

(22) Filed: Feb. 25, 2008

(65) Prior Publication Data

US 2008/0222258 A1    Sep. 11, 2008

Related U.S. Application Data

(60) Provisional application No. 60/905,810, filed on Mar. 9, 2007.

(30) Foreign Application Priority Data

Sep. 11, 2007    (KR) ........................ 10-2007-0092207

(51) Int. Cl.
H04L 29/06    (2006.01)
G06F 21/10    (2013.01)
H04L 12/28    (2006.01)

(52) U.S. Cl.
CPC ............. *G06F 21/10* (2013.01); *H04L 12/2803* (2013.01)
USPC .......................................... 726/26; 709/206

(58) Field of Classification Search
CPC ............................ G06F 21/10; H04L 12/2803
USPC ...................................................... 726/27, 26
See application file for complete search history.

(56) References Cited

U.S. PATENT DOCUMENTS

| 7,424,613 | B2 | 9/2008 | Han et al. | |
| 7,810,162 | B2 | 10/2010 | Lee et al. | |
| 2005/0086514 | A1 | 4/2005 | Han et al. | |
| 2005/0091508 | A1* | 4/2005 | Lee et al. | ...................... 713/182 |
| 2005/0135341 | A1* | 6/2005 | Kim | ................................ 370/352 |
| 2005/0210241 | A1* | 9/2005 | Lee et al. | ...................... 713/158 |
| 2005/0216763 | A1 | 9/2005 | Lee et al. | |
| 2006/0041511 | A1* | 2/2006 | Ahn | ................................ 705/51 |
| 2006/0059094 | A1 | 3/2006 | Oh et al. | |

(Continued)

FOREIGN PATENT DOCUMENTS

| CN | 1665240 A | 9/2005 |
| EP | 1635545 A1 | 3/2006 |

(Continued)

OTHER PUBLICATIONS

Chinese Office Action dated Jul. 20, 2011 issued in counterpart Chinese Application No. 200880015218.7.

(Continued)

*Primary Examiner* — Hadi Armouche
*Assistant Examiner* — Dao Ho
(74) *Attorney, Agent, or Firm* — Sughrue Mion, PLLC

(57) ABSTRACT

A digital rights management (DRM) method and apparatus are provided. The DRM method includes generating a rights object request message for requesting a rights object corresponding to content stored in a media player and transmitting the rights object request message; receiving a rights object response message corresponding to the rights object request message from a media server which receives the rights object request message; and obtaining a rights object using the rights object response message.

8 Claims, 15 Drawing Sheets

(56) References Cited

U.S. PATENT DOCUMENTS

| | | |
|---|---|---|
| 2006/0059168 A1* | 3/2006 | Hamada et al. ............... 707/100 |
| 2006/0161635 A1* | 7/2006 | Lamkin et al. ................ 709/217 |
| 2006/0184851 A1* | 8/2006 | Froidcoeur et al. ........... 714/746 |
| 2008/0040618 A1 | 2/2008 | Andersson et al. |

FOREIGN PATENT DOCUMENTS

| | | |
|---|---|---|
| KR | 2005/055022 A1 | 6/2005 |
| KR | 10-2005-0096040 A | 10/2005 |
| KR | 10-0533678 B1 | 12/2005 |
| KR | 10-0582549 B1 | 5/2006 |
| KR | 10-0695442 B1 | 3/2007 |
| WO | 2006/029978 A1 | 3/2006 |

OTHER PUBLICATIONS

Communication dated Apr. 29, 2014, issued by the Korean Intellectual Patent Office in counterpart Korean Application No. 10-2007-0092207.

* cited by examiner

FIG. 5E

```
response: Browse["
    <item id="OBJ-001" parented="-1" restricted="1">
        <dc:title>Alice</dc:title>
        <upnp:class>object.item.audioItem.musicTrack</upnp:class>
        <res license="http://myhome.net/license?cid=CID-001"
             licenseID="lid001" contented="cid001">
            http://myhome.net/content?id=OBJ-001
        </res>
    </item>", "1", "1"]
```

550

552

552a

```
response: Search("
    <item id="OBJ-001" parented="-1" restricted="1">
        <dc:title>Alice</dc:title>
        <upnp:class>object.item.audioItem.musicTrack</upnp:class>
        <res license="http://myhome.net/license?cid=CID-001"
            licenseID="lid001" contented="cid001">
            http://myhome.net/content?id=OBJ-001
        </res>
    </item>", "1", "1")
```

```
response: Search("
    <item id="OBJ-001" parented="-1" restricted="1">
        <dc:title>Alice</dc:title>
        <upnp:class>object.item.audioItem.musicTrack</upnp:class>
        <res protocolInfo="http-get:*:audio/mpeg:license=
            http://myhome.net/license?cid=CID-001;licenseID=
            lid001;contented:cid001">
            http://myhome.net/content?id=OBJ-001
        </res>
    </item>", "1", "1")
```

DIGITAL RIGHTS MANAGEMENT METHOD AND APPARATUS

CROSS-REFERENCE TO RELATED PATENT APPLICATIONS

This application claims priority from U.S. Provisional Patent Application No. 60/905,810 filed on Mar. 9, 2007, and Korean Patent Application No. 10-2007-0092207 filed on Sep. 11, 2007 in the Korean Intellectual Property Office, the disclosures of which are incorporated herein by reference in their entirety.

BACKGROUND OF THE INVENTION

1. Field of the Invention

Methods and apparatuses consistent with the present invention relate to digital rights management (DRM), and more particularly, to DRM method and apparatus which can effectively manage rights objects.

2. Description of the Related Art

Recently, digital rights management (DRM) has been researched actively and commercial services using DRM have already been implemented or will be implemented. DRM is a technical concept to protect digital content that can be readily copied and distributed without permission.

Some efforts have been made to protect digital content. In a related art, digital content protection has concentrated on preventing those without permission to access digital content. Specifically, only those people who have paid fees are permitted to access the digital content, and persons who have not paid the charges are denied access the digital content. However, the digital content can be readily copied, reused, processed and distributed to third parties according to the characteristics of the digital data. Accordingly, when a person who has paid the fees accesses the digital content and intentionally distributes it to a third party, the third party can use the digital content without paying the fees, which has produced a number of problems.

In order to solve these problems, in DRM, the digital content is encrypted and distributed, and a specified license called a rights object is needed to use the encrypted digital content.

After a media player obtains rights, if the rights object stored in the media player disappears, the media player may, again, request a universal plug and play (UPnP) media server to provide the rights object. Then, the UPnP media server may compare an object ID, which is an identifier of content corresponding to the rights object requested by the media player, and provide the rights object to the media player.

However, if the object ID used to identify the content stored in the media server lapses after a predetermined period of time or if the media server is rebooted, the object ID corresponding to the content may disappear or change. Accordingly, a new object ID may be given to the content. Consequently, the media server cannot find the content corresponding to the rights object requested by the media player and thus cannot provide the rights object to the media player.

In addition, after the media player obtains a rights object from an external DRM system, if the rights object stored in the media player disappears, the media player may request the media server to provide the rights object. However, since an object ID stored in the media server cannot recognize a content ID used to identify content in the external DRM system, the media server cannot find content corresponding to the rights object requested by the media server and thus cannot provide the rights object to the media player.

SUMMARY OF THE INVENTION

The present invention provides a method and apparatus which enable a media player to obtain a rights object again from a media server by re-prescribing objects and functions prescribed in a universal plug and play (UPnP) system and thus recognizing a content ID of an external digital rights management (DRM) system.

However, the aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a DRM method. The DRM method includes generating a rights object request message for requesting a rights object corresponding to content stored in a media player and transmitting the rights object request message; receiving a rights object response message corresponding to the rights object request message from a media server which receives the rights object request message; and obtaining a rights object using the rights object response message.

According to another aspect of the present invention, there is provided a DRM apparatus. The DRM apparatus includes a DRM module generating a rights object request message; and a rights object search module searching for a rights object which corresponds to the rights object request message, wherein the rights object request message is transmitted to a media server, a rights object response message corresponding to the rights object request message is received from the media server, and content stored in a media player is played back using the rights object response message.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

Figure 1:
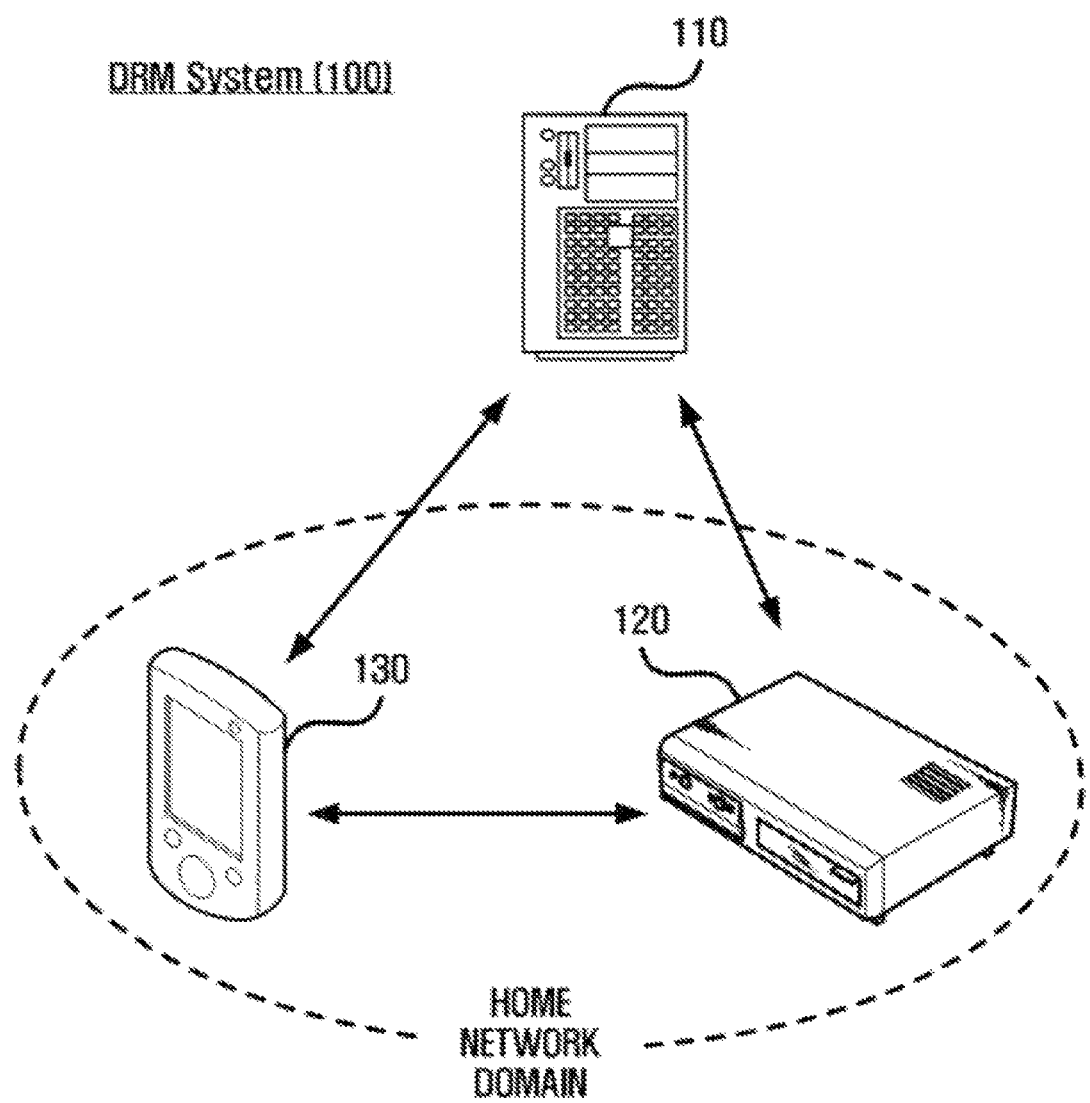
FIG. 1 illustrates a digital rights management (DRM) system according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. Like reference numerals in the drawings denote like elements, and thus their description will be omitted.

Exemplary embodiments of the present invention will hereinafter be described in detail with reference to the accompanying drawings.

FIG. 1 illustrates a digital rights management (DRM) system 100 according to an exemplary embodiment of the present invention. Referring to FIG. 1, the DRM system 100 includes a rights issuer 110, a media server 120, and a media player 130. While one rights issuer, one media server, and one media player are included in the DRM system 100 of FIG. 1, the DRM system 100 may include a plurality of rights issuers, a plurality of media servers, and a plurality of media players in other embodiments of the present invention.

The present invention is based on an assumption that the media player 130 obtains a rights object from the rights issuer 110 and stores the obtained rights object in the media server 120. Hence, the media player 130 can search for the rights object stored in the media server 120.

The media server 120 is a device that stores content objects or rights objects in a storage medium included therein, such as a hard disk or a flash memory, and provides the stored content objects or the stored rights objects to the media player 130. Examples of the media server 120 include a personal video recorder (PVR) and a personal computer (PC).

The media player 130 is a device that receives a rights object from the media server 120 and plays back a content object using the received rights object. In this case, the media player 130 may obtain a content object, which is to be played back, from the media server 120 or another device or network. The media player 130 may also obtain a rights object from another device or network. Examples of the media player 130 include a digital television (TV), a portable multimedia player (PMP), a mobile phone, a personal digital assistant (PDA), and a Moving Picture Experts Group (MPEG) audio layer-3 (MP3) player.

The rights issuer 110 issues a rights object and provides the rights object to a device (for example, the media server 120 or the media player 130) of a user who has paid for the rights object.

In the exemplary embodiment of the present invention, a content object denotes digital content in an encrypted form. The digital content may be of any type, such as movies, music, photographs, games, documents, etc.

A rights object is a sort of license that includes a right to use a content object. The rights object includes a content encryption key (CEK), permission information, constraint information, a content ID of a content object which can be decrypted using the CEK, and the like.

The CEK is a key that can be used to play back a content object and may have a predetermined binary value. For example, the CEK may be used to decrypt a content object and thus obtain original digital content.

The permission information indicates a playback type of a content object and a reproduction type of a rights object.

Examples of the playback type may include "Play," "Display," "Execute," and "Print." "Play" indicates the right to express a content object in an audio/video format. For example, if a content object is a moving image or music, "Play" may be set as permission information of a rights object that is to be consumed in order to play back the content object. "Display" indicates the right to display a content object on a visual device, and "Print" indicates the right to generate a hard copy of the content object. For example, if a content object is a still image, at least one of "Display" and "Print" may be set as permission information of a rights object that is to be consumed in order to play back the content object. "Execute" indicates the right to execute a content object such as a game or an application program. For example, if a content object is a Java game, "Execute" may be set as permission information of a rights object that is to be consumed in order to play back the content object.

Meanwhile, examples of the reproduction type may include "Copy" and "Move." "Copy" and "Move" indicate the rights to store a rights object, which is stored in a device, in another device. If a rights object, which is stored in a current device, is "moved" to another device, the rights object stored in the current device is deactivated. However, even if a rights object, which is stored in a current device, is "copied" to another device, the rights object stored in the current device is not deactivated. Here, deactivation may denote deletion of a rights object.

The constraint information refers to constraints on allowing a content object to be played back, and one or more pieces of constraint information may be set for the permission information. Examples of the constraint information may include a count constraint, a datetime constraint, an interval constraint, and an accumulated constraint.

While a content object and a rights object have been described above, the above descriptions are mere examples, and the present invention is not limited thereto.

Referring back to FIG. 1, the media server 120 and the media player 130 may form a home network domain. The home network domain is a group of devices that can share a rights object. For example, it may be allowed to move or copy a rights object between devices within the same home network domain. Hereinafter, a rights object, which can be shared by devices within a home network domain, will be referred to as a domain rights object.

The rights issuer 110 manages a home network domain. The rights issuer 110 may create a home network domain and control joining or withdrawal of devices to/from the home network domain. According to an exemplary embodiment of the present invention, home network domain management may be based on an Open Mobile Alliance (OMA) DRM standard. Since a specific process of the home network domain management may vary according to embodiments, the present invention is not limited to a home network domain management method or process used by the rights issuer 110.

In this specification, a detailed description of the home network domain management will be omitted. However, for a better understanding of the present invention, a process in which the media player 130 joins a home network domain will be described in an exemplary embodiment.

Figure 2:
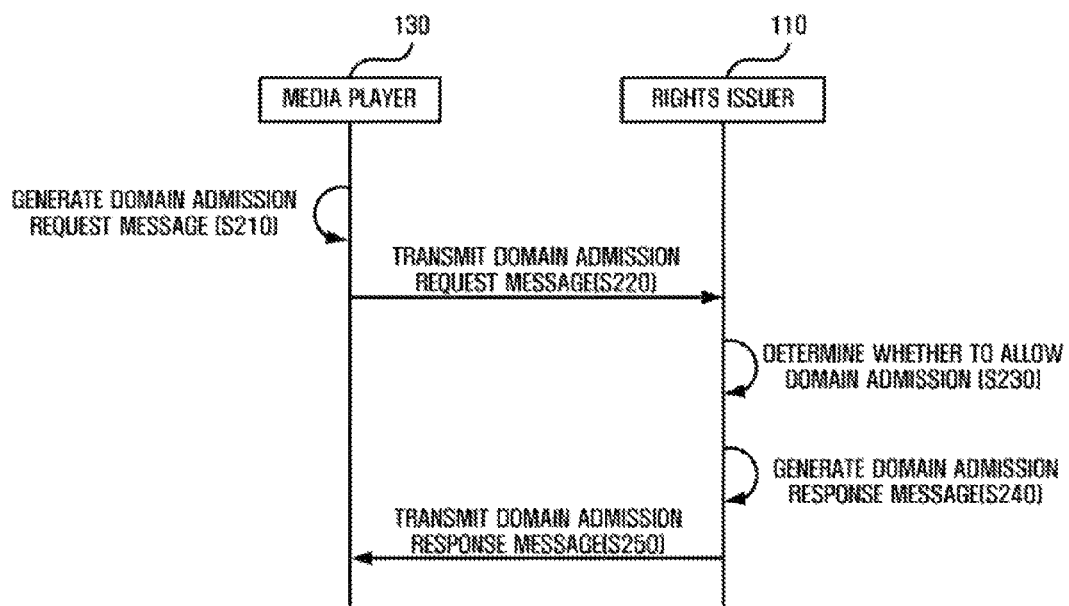
FIG. 2 is a flowchart illustrating a process in which a media player joins a DRM domain according to an exemplary embodiment of the present invention.

FIG. 2 is a flowchart illustrating a process in which the media player 130 joins a home network domain according to an exemplary embodiment of the present invention.

Referring to FIG. 2, the media player 130, which desires to join a home network domain, may generate a domain admission request message (operation S210) and transmit the domain admission request message to the rights issuer 110 (operation S220). The domain admission request message may include a device ID of the media player 130 and a domain ID of the home network domain that the media player 130 desires to join. The domain ID is information used to identify the home network domain. When creating a home network domain, the rights issuer 110 may allocate a domain ID to the home network domain. The media player 130 may obtain the domain ID, in advance, from a user's input or a device which has already joined the home network domain.

After receiving the domain admission request message, the rights issuer 110 may determine whether to allow the media player 130 to join the home network domain (operation S230). For example, if the number of devices that can join the home network domain is limited to a predetermined threshold number, the rights issuer 110 may determine whether the number of devices that have joined the home network domain is less than the predetermined threshold number. If the number of devices which have joined the home network domain is less than the predetermined threshold number, the rights issuer 110 may allow the media player 130 to join the home network domain. However, if the number of devices which have joined the home network domain is not less than (that is, is equal to) the predetermined threshold number, the rights issuer 110 may not allow the media player 130 to join the home network domain. A method used by the rights issuer 110 to determine whether to allow the media player 130 to join the home network domain may vary according to embodiments, and the present invention is not limited to the embodiments.

Next, the rights issuer 110 may generate a domain admission response message (operation S240) and transmit the domain admission response message to the media player 130 (operation S250). The domain admission response message may include information regarding whether the media player 130 is allowed to join the home network domain. According to an exemplary embodiment of the present invention, if the domain admission response message contains information that the media player 130 is allowed to join the home network domain, it may include a domain key. When successfully joining the home network domain, the media player 130 may obtain the domain key from the domain admission response message. Therefore, all the devices that have joined the home network domain may possess the domain key received from the rights issuer 110.

According to an exemplary embodiment of the present embodiment, a domain key may be a basis on which devices in a home network can share a domain rights object. For example, a domain rights object or a CEK in the domain rights object may be encrypted using a domain key. In this case, even if a device, which does not have the domain key, obtains the domain rights object, it cannot use the domain rights object. On the other hand, a device, which has the domain key, can decrypt the encrypted domain rights object or the encrypted CEK using the domain key. Consequently, use of the domain rights object by an external device can be prevented. However, the present invention is not limited to the above method of protecting a domain rights object.

According to another exemplary embodiment of the present invention, a domain key may protect a communication session between devices in a home network domain. For example, various messages or data exchanged between devices in a home network domain may be encrypted using a domain key. In this case, a request for a domain rights object or a response to the request may be made normally between devices that have the domain key. However, such operations cannot be performed normally between devices that do not have the domain key. There may be various methods of protecting a domain rights object using a domain key or information other than the domain key, and the present invention is not limited to the above method of protecting a domain rights object.

Figure 3:
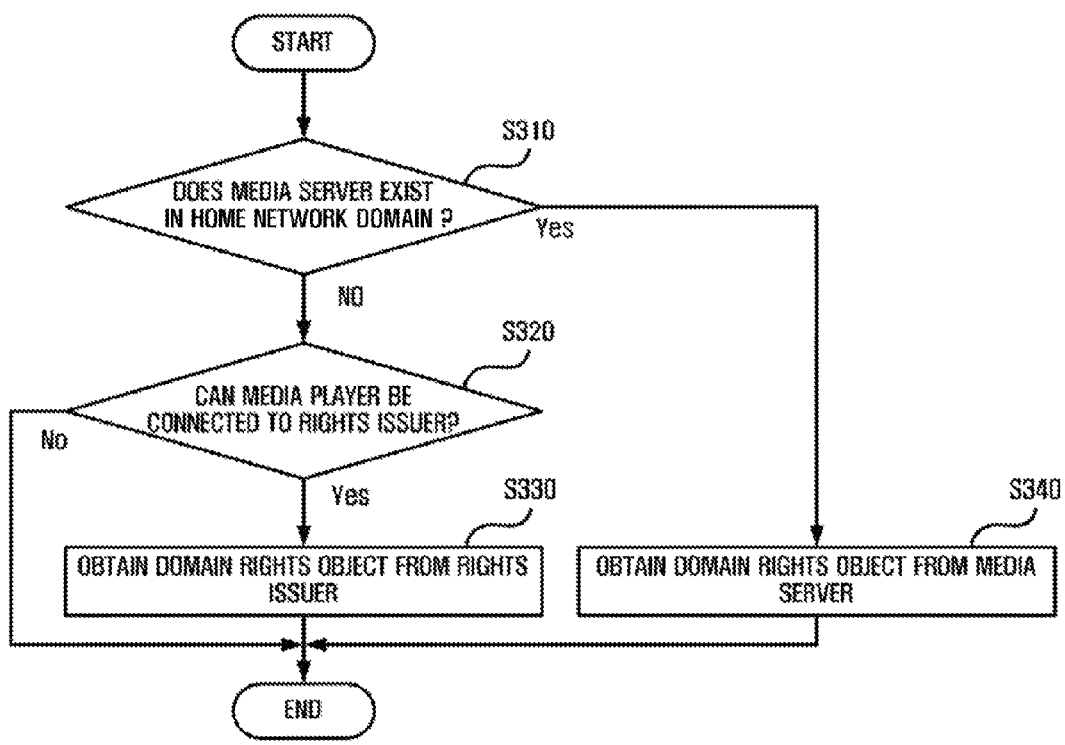
FIG. 3 is a flowchart illustrating a process in which the media player obtains a domain rights object according to an exemplary embodiment of the present invention.

FIG. 3 is a flowchart illustrating a process in which the media player 130 obtains a domain rights object according to an exemplary embodiment of the present invention.

Referring to FIG. 3, the media player 130 identifies whether the media server 120 exists in a home network domain (operation S310). According to an exemplary embodiment of the present invention, the media player 130 and the media server 120 may be universal plug and play (UPnP) audio/video (AV) compatible devices. The media player 130 may include the function of a UPnP control point. In this case, whether the media server 120 exists in the home network domain may be identified through UPnP-based discovery or advertising.

If the media server 120 does not exist in the home network domain, the media player 130 determines whether it can be connected to the rights issuer 110 (operation S320). Whether the media player 130 can be connected to the rights issuer 110 can be identified by whether it can access an external network (such as the Internet) to which the rights issuer 110 is connected.

If the media player 130 determines in operation S320 that it can be connected to the rights issuer 110, it may obtain a domain rights object from the rights issuer 110 (operation S330). In operation S330, the media player 130 may request the rights issuer 110 to provide a domain rights object, and the rights issuer 110 may provide the domain rights object to the media player 130. When requesting the rights issuer 110 to provide a domain rights object, the media player 130 may inform the rights issuer 110 about a domain rights object of which home network domain it requires by using a domain ID. The present invention is not limited to the process in which the media player 130 obtains the domain rights object from the rights issuer 110.

If the media player 130 identifies in operation S310 that the media server 120 exists in the home network domain, the media player 130 may obtain the domain rights object from the media server 120 (operation S340). Operation S340 will now be described in more detail with reference to FIG. 4.

Figure 4:
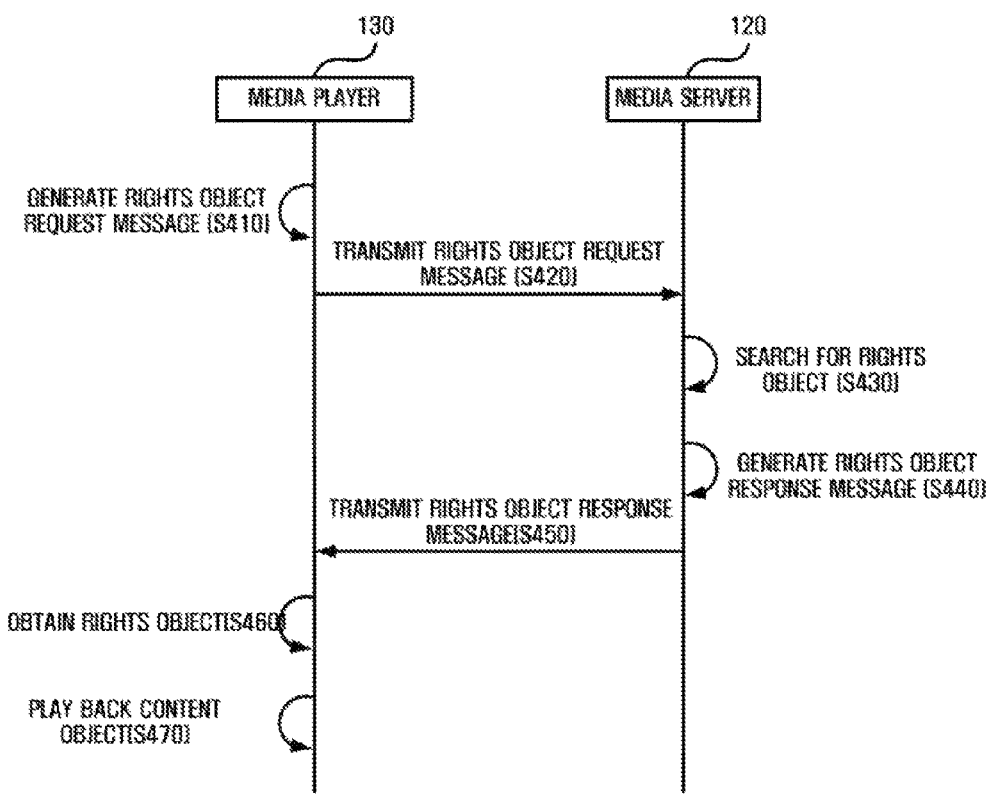
FIG. 4 is a flowchart illustrating a process in which the media player obtains a domain rights object from a media server according to an exemplary embodiment of the present invention.

FIG. 4 is a flowchart illustrating a process in which the media player 130 obtains a domain rights object from the media server 120 according to an exemplary embodiment of the present invention. In the present embodiment, it is assumed that the media server 120 has obtained a domain rights object from the rights issuer 110 in advance, and that the media player 130 has no domain rights object since a necessary domain rights object previously held by the media player 130 has disappeared.

First of all, a method (hereinafter, referred to as a UPnP item) of expressing content in a UPnP system using UPnP will be now described. The UPnP item newly prescribes an individual content ID given by a DRM system as metadata that can be expressed. Accordingly, the UPnP item may include both of an object ID provided by a related art UPnP system and a content ID provided by the DRM system. Therefore, a media player may include an action, which includes a content ID corresponding to at least a piece of content as an input parameter, or a search action in a rights object request message, which will be described in detail later. Alternatively, the media player may directly include a content ID in the rights object request message.

It may be newly prescribed that, while an object ID in the related art UPnP system is changed or disappears if a media server in the related art UPnP system is rebooted, a previously set value of an object ID of the UPnP item is not changed. Therefore, the object ID may be included in the rights object request message, which will be described in detail later.

Based on the prescription of the UPnP item, the media player 130, which desires to play back a content object, may generate a rights object request message (operation S410) and transmit the rights object request message to the media server 120 (operation S420). The rights object request message may include basic search information that can be used by the media server 120 to search for a rights object required by the media player 130. For example, the rights object request message may include a rights object ID of a rights object required by the media player 130. Alternatively, the rights object request message may include a content ID of a content object to be played back by the media player 130. The rights object ID and the content ID are identifiers used to identify a rights object and a content object, respectively, in a home network domain-based DRM standard. An example of the DRM standard is the OMA DRM standard.

According to an exemplary embodiment of the present invention, the rights object request message may include an object ID used to identify an object in a UPnP content directory service (CDS) standard, which will be described in detail later. In this case, the object identified by the object ID in the rights object request message is a rights object.

The media server 120 may receive the rights object request message and search for a rights object requested by the media player 130 (operation S430). If the rights object request message includes a rights object ID, the media server 120 may search for a rights object identified by the rights object ID. If the rights object request message includes a content ID, the media server 120 may search for a rights object that has the right to play back a content object identified by the content ID. Since a rights object ID or a content ID may be recorded in a specified field of each rights object, the media server 120 may search for a rights object by checking the field of each rights object stored therein. However, this is a mere exemplary embodiment of the present invention, and the present invention is not limited thereto.

According to another exemplary embodiment of the present invention, the media server 120 may manage metadata, which includes rights object IDs of rights objects stored in the media server 120 or content IDs of content objects that can be played back using the rights objects, together with the rights objects. In this case, the media server 120 can search for a rights object using the metadata without checking a specified field of each rights object. If there exist a plurality of media servers, the media player 130 may search for a media server, which has a rights object corresponding to content stored in the media player 130, using the rights object request message and request the found media server to provide the rights object.

If the rights object request message includes a UPnP CDS-based object ID, the media server 120 may search for an object (i.e., a rights object) identified by the UPnP CDS-based object ID.

When finding the rights object requested by the media player 130, the media server 120 may generate a rights object response message (operation S440) and transmit the rights object response message to the media player 130 (operation S450). According to an exemplary embodiment of the present invention, the rights object response message may include the found rights object. According to another exemplary embodiment of the present invention, the rights object response message may include a uniform resource identifier (URI) of the found rights object. When failing to find the rights object requested by the media player 130, the media server 120 may generate a rights object response message, which contains information indicating that the rights object does not exist, and transmit the rights object response message to the media player 130.

After receiving the rights object response message, the media player 130 may obtain the rights object using the rights object response message (operation S460). If the rights object response message includes the rights object, the media player 130 may obtain the rights object directly from the rights object response message. However, if the rights object response message contains a URI of the rights object, the media player 130 may access the URI and obtain the rights object.

Then, the media player 130 may play back the content object using the obtained rights object (operation S470).

Although not mentioned in the exemplary embodiment of FIG. 4, the security for a domain rights object in a home network domain may be continuously maintained. For example, in FIG. 4, a domain rights object or the CEK of the domain rights object may be encrypted using a domain key allocated by the rights issuer 110. Alternatively, messages exchanged between the media server 120 and the media player 130 may be encrypted or decrypted using the domain key. However, the method of protecting a domain rights object may vary according to the embodiments as described above.

According to an exemplary embodiment of the present invention, devices that form a home network domain are UPnP AV compatible devices. The media player 130 may include the function of a UPnP AV-based control point. However, the present invention is not limited thereto. That is, a separate device functioning as a control point may exist independently of the media player 130.

If the devices in the home network domain follow UPnP AV related UPnP standards, the rights object request message and the rights object response message exchanged between the media player 130 and the media server 120 in the exemplary embodiment of FIG. 4 may be based on the UPnP CDS standard. More specifically, the rights object request message transmitted in operation S420 and the rights object response message transmitted in operation S450 may be generated using a UPnP CDS-based action. Hereinafter, an exemplary embodiment in which a UPnP AV protocol is used by devices in a home network domain to request and obtain a domain rights object will be described.

According to an exemplary embodiment of the present invention, a new UPnP CDS-based action may be defined so that the media player 130 and the media server 120 in the home network domain can share a rights object. Hereinafter, the newly defined action is referred to as 'X_GetLicense.' Table 1 shows arguments of the 'X_GetLicense' action according to an exemplary embodiment of the present invention.

TABLE 1

| Argument | Direction | State Variable |
|---|---|---|
| ID | IN | A_ARG_TYPE_ContentID or A_ARG_TYPE_ROID |
| IDType | IN | A_ARG_TYPE_IDType |
| DRMType | IN | A_ARG_TYPE_DRMType |
| License | OUT | A_ARG_TYPE_ContentLicense |

In Table 1, 'Direction' indicates to which of a request and a response each argument belongs. Here, the request may be a concept included in the rights object request message, and the response may be a concept included in the rights object response message. In 'Direction' of Table 1, 'IN' indicates that an argument is included in the request, and 'OUT' indicates that the argument is included in the response.

In 'Argument' of Table 1, 'ID' indicates a content ID or a rights object ID. The media player 130 transmitting the rights object request message may include a content ID of a content object to be played back or a rights object ID of a necessary rights object in a request that uses the 'X_GetLicense' action.

In Table 1, 'IDType' is an argument indicating which of a content ID and a rights object ID that 'ID' represents. In addition, a 'DRMType' argument indicates a supportable DRM method. Therefore, the media server 120 receiving the request that uses the 'X_GetLicense' action can identify that the media player 130 requires a DRM standard-based rights object identified by the 'DRMType' argument in the request.

In Table 1, a 'License' argument indicates a rights object or a URI of the rights object.

In Table 1, 'State Variable' indicates a variable related to each argument. A state variable may be represented in any form or by any value as long as it can be applied to the UPnP CDS standard. Exemplary embodiments of the request and the response using the 'X_GetLicense' action as shown in Table 1 are schematically illustrated in FIGS. 5A through 5C.

Figure 5A:
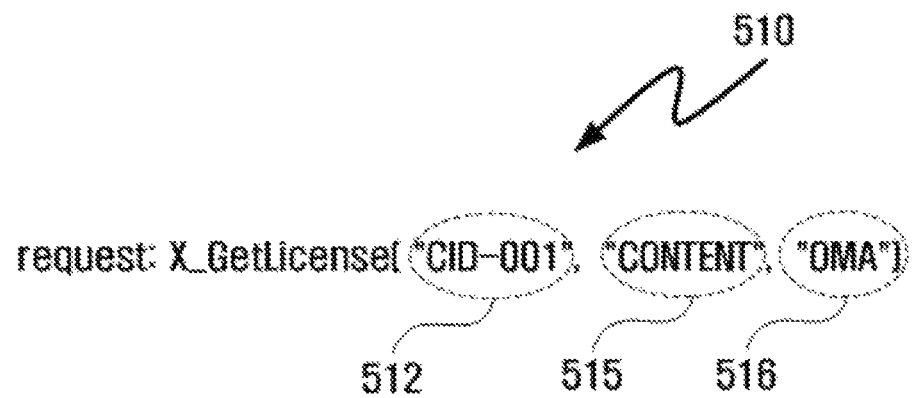
FIGS. 5A through 5I illustrates universal plug and play (UPnP) content directory service (CDS)-based actions according to an exemplary embodiment of the present invention.

FIG. 5A illustrates a request 510 of the 'X_GetLicense' action according to an exemplary embodiment of the present invention. Referring to FIG. 5A, the request 510 includes 'CID-001' 512, 'CONTENT' 515 and 'OMA' 516 as parameters of the 'ID,' 'IDType' and 'DRMType' arguments shown in Table 1. Since the parameter of the 'IDType' argument is 'CONTENT' 515, 'CID-001' 512, which is the parameter of the 'ID' argument, indicates a content ID. In addition, since the parameter of the 'DRMType' argument is 'OMA' 516, it can be interpreted from the request 510 that the media player 130 requires an OMA DRM standard-based rights object. In FIG. 5A, the request 510, which uses 'CONTENT' 515 as the parameter of the 'IDType' argument, has been described as an example. However, a request, which uses a rights object ID as the parameter of the 'IDType' argument, can also be made.

Figure 5B:
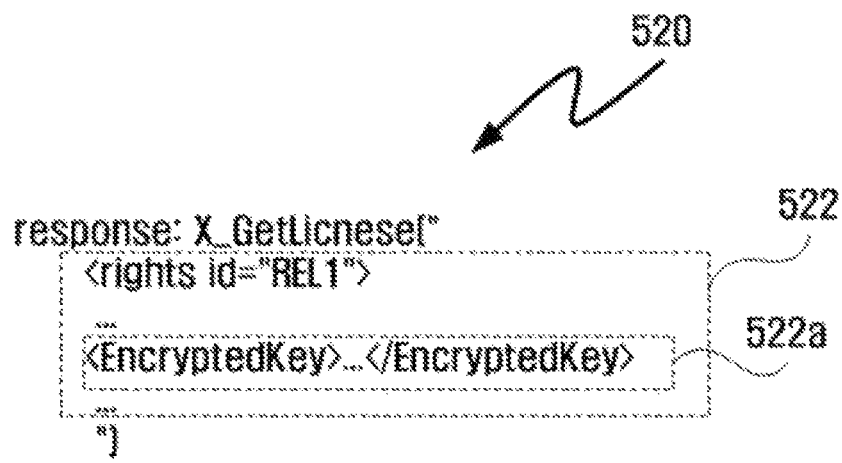

FIG. 5B illustrates a response 520 of the 'X_GetLicense' action according to an exemplary embodiment of the present invention. Referring to FIG. 5B, the response 520 includes a rights object 522 as the 'License' argument shown in Table 1. In addition, a CEK is included in an EncryptedKey line 522a. Although the rights object 522 is not specified in detail, the rights object 522 included in the response 520 may be expressed in an extensible markup language (XML) document.

Figure 5C:

FIG. 5C illustrates a response 530 of the 'X_GetLicense' action according to another exemplary embodiment of the present invention. Referring to FIG. 5C, the response 530 includes a URI 532 of a rights object. When receiving the response 530, the media player 130 may access 'http://myhome.net/licence?cid=CID-001' and obtain the rights object.

According to an exemplary embodiment of the present invention, a UPnP CDS-based browse action may be used by the media player 130 and the media server 120 in the home network domain to share a rights object, which will now be described with reference to FIGS. 5D and 5E.

Figure 5D:
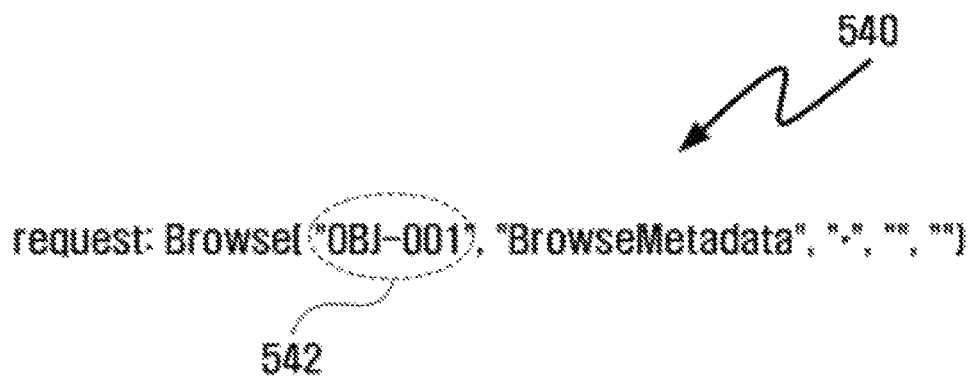

FIG. 5D illustrates a request 540 of the browse action according to an exemplary embodiment of the present invention. Referring to FIG. 5D, a first parameter 'OBJ001' 542 in the request 540 indicates a UPnP CDS-based object ID. The media server 120 may allocates a UPnP CDS-based object ID to a newly stored rights object. In this case, if the media player 130 is aware of the object ID of the rights object, it may generates the rights object request message using the browse action as illustrated in FIG. 5D.

Figure 5F:
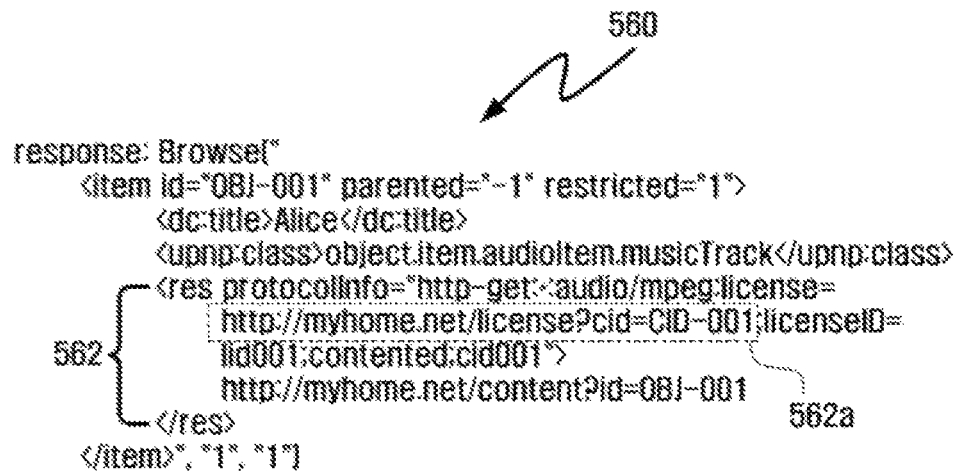

FIG. 5E illustrates a response 550 corresponding to the request 540 of the browse action of FIG. 5D according to an exemplary embodiment of the present invention. The response 550 illustrated in FIG. 5E may include a URI 552a of an object (i.e., a rights object) identified by the object ID, i.e., 'OBJ001' 542, in the request 540 of FIG. 5D as an attribute of a <res> property 522 in the UPnP CDS-based browse action. FIG. 5F illustrates a response 560 corresponding to the request 540 of the browse action of FIG. 5D according to another exemplary embodiment of the present invention. The response 560 illustrated in FIG. 5F also includes a URI 562a of a rights object as an attribute of a <res> property 562.

The media player 130 may obtain a URI of a rights object from the rights object response message, which includes the response 550 or 560 illustrated in FIG. 5E or 5F, received from the media server 120 and obtain the rights object using the URI.

Figure 5G:
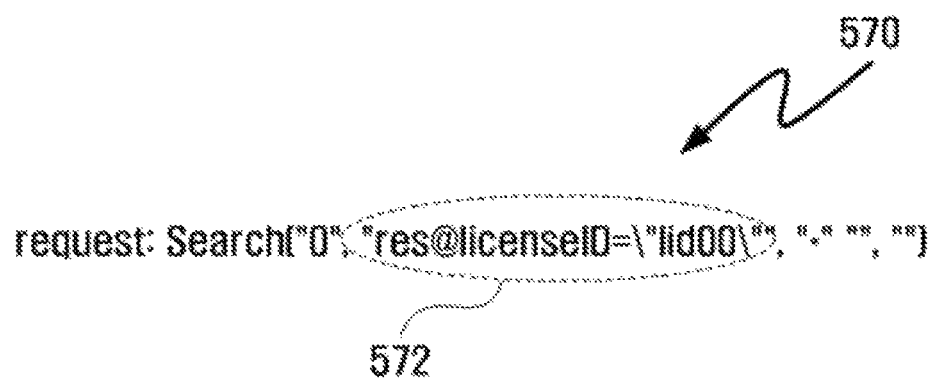
Figure 5H:
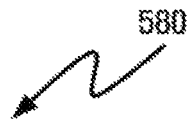
Figure 5:

According to an exemplary embodiment of the present invention, a rights object, instead of its URI, may be included in the response 550 or 560 of FIG. 5E or 5F. Here, the rights object may be expressed in the form of an XML document. According to an exemplary embodiment of the present invention, a UPnP CDS-based search action may be used by the media player 130 and the media server 120 in the home network domain to share a rights object. FIG. 5G illustrates a request 570 of the search action according to an exemplary embodiment of the present invention. Examples of responses to the request 570 are illustrated in FIGS. 5H and 5I. The request 570 illustrated in FIG. 5G contains information 572 used to identify a domain rights object. Therefore, the media server 120 can search for a domain rights object requested by the media player 130 using the information 572. In addition, the information 572 may include a content ID or a rights object ID corresponding to content provided by a DRM system. In addition, the search action may be limited to include only a content ID as an input parameter. By limiting a variable of the search action to the content ID, a new rights object can be easily and efficiently searched for and obtained.

Since responses 580 and 590 illustrated in FIGS. 5H and 5J can be understood as being similar to the responses 550 and 560 illustrated in FIGS. 5E and 5F, a detailed description thereof will be omitted.

According to an exemplary embodiment of the present invention, content directory hierarchy configuration of the UPnP media server 120 is browsed using a rights object request message, which includes a content ID directly prescribed in the UPnP item, instead of a specified action prescribed in UPnP. If corresponding content exists, a rights object can be obtained as described above.

According to an exemplary embodiment of the present invention, if a rights ID prescribed in the UPnP system does not disappear or change, a rights object can be obtained using existing information regarding the rights object which is stored in the media server 120.

According to an exemplary embodiment of the present invention, the media server 120 may generate and manage a UPnP CDS-based object (hereinafter, referred to as a rights object expression object) corresponding to a rights object and expressing the rights object. The rights object expression object is newly defined as an exemplary embodiment of the present invention. The rights object expression object may include all characteristics of a UPnP CDS-based object, and a <res> property of the rights object expression object may express a URI of a corresponding rights object. In addition, a class of the rights object expression object may inherit attributes of an item class. For example, the class of the rights object expression object may be represented by "object.item.licenseItem.omaDrm."

According to an exemplary embodiment of the present invention, the media server 120 may newly define a container object which manages a rights object. Part of a 'res@protocolInfo' property expressing multipurpose Internet mail extensions (MIME) of a resource of the newly defined container object may follow a rights object MIME type defined by the DRM standard that a rights object follows. For example, if a rights object is based on the OMA DRM standard, part of the 'res@protocolInfo' property may follow application/vnd.oma.drm.ro_xml.

As described above, when a rights object expression object corresponding to a rights object is managed separately, if the media server 120 is requested by the media player 130 to provide a rights object, it may provide a rights object expression object corresponding to the requested rights object to the media player 130. Here, since the <res> property of the rights object expression object expresses a URI of the rights object, the media player 130 may access the URI and obtain the rights object.

Figure 6:
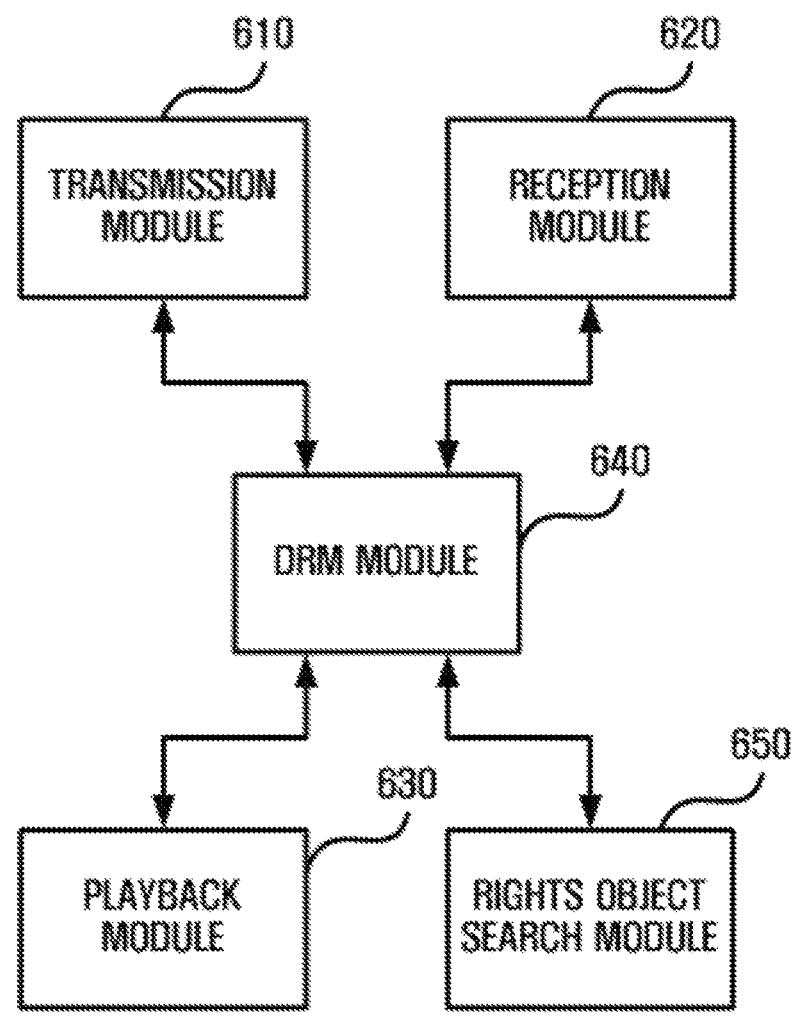
FIG. 6 is a block diagram of a media player according to an exemplary embodiment of the present invention.

FIG. 6 is a block diagram of a media player 130 according to an exemplary embodiment of the present invention. Referring to FIG. 6, the media player 130 includes a transmission module 610, a reception module 620, a playback module 630, a DRM module 640, and a rights object search module 650.

The transmission module 630 may transmit data, messages, and other information to other devices or networks. The reception module 620 may receive data, messages, and other information from other devices or networks. In FIG. 6, the transmission module 610 and the reception module 620 are illustrated as separate components. However, in other embodiments, the transmission module 610 and the reception module 620 may be integrated into a single component. The transmission module 610 and the reception module 620 may use a wireless communication protocol, such as a wireless local area network (WLAN), a wireless personal area network (WPAN) or Bluetooth, or a wireless communication protocol such as power line communication (PLC), Institute of Electrical and Electronics Engineers (IEEE) 1394 or a universal serial bus (USB). In other embodiments, the transmission module 610 and the reception module 620 may use both of the wired communication protocol and the wireless communication protocol.

The playback module 630 may play back a content object using a rights object. The playback module 630 may be based on a digital media processing standard such as a Moving Picture Experts Group (MPEG), MPEG-1 Audio Layer 3 (MP3) or Joint Photographic Coding Experts Group (JPEG) standard.

The DRM module 640 controls generation, processing and interpretation of a message for digital rights management and consumption of a rights object. For example, the DRM module 640 may control a home network domain admission process described above with reference to FIG. 2 and may determine whether to allow the playback module 630 to play back a content object using a rights object. Whether to allow the consumption of a rights object may be determined based on permission information and constraint information of the rights object. The DRM module 640 may be responsible for the security of a home network domain. According to an exemplary embodiment of the present invention, the DRM module 640 may include an encryption/decryption module (not shown) and a security storage module (not shown).

The encryption/decryption module may decrypt a content object using a CEK of a rights object and perform encryption and decryption operations required to protect a domain rights object in a home network domain. The encryption/decryption module may use at least one of public-key cryptography, such as a Diffie-Hellman algorithm, a Rivest Shamir Adleman (RSA) algorithm, an ElGamal algorithm or an elliptic curve algorithm, and symmetric-key cryptography such as a data encryption standard (DES) algorithm or an advanced encryption standard (AES) algorithm.

The security storage module stores data that requires security, such as a rights object, a domain key, and a private key of the public-key cryptography. The security storage module may be logically or physically protected from access by an external device.

Referring back to FIG. 6, the rights object search module 650 obtains a rights object from the media server 120. Desirably, but not necessarily, the rights object search module 650 may generate and interpret a UPnP AV protocol-based message. For example, the rights object search module 650 may process UPnP CDS-based actions illustrated in FIGS. 5A through 5I.

If the media player 130 is a UPnP AV compatible device, it may further include a control module (not shown) processing a UPnP-based operation (such as discovery or advertising). The control module may be integrated into the rights object search module 650.

Figure 7:
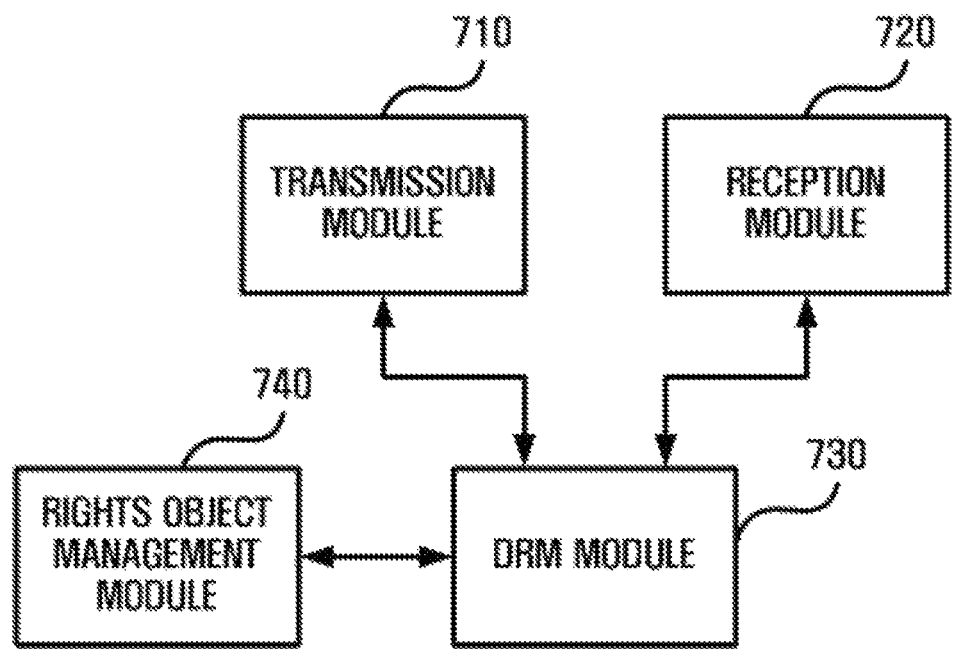
FIG. 7 is a block diagram of a media server according to an exemplary embodiment of the present invention.

FIG. 7 is a block diagram of a media server 120 according to an exemplary embodiment of the present invention. Referring to FIG. 7, the media server 120 includes a transmission module 710, a reception module 720, a DRM module 730, and a rights object management module 740.

The transmission module 710 and the reception module 720 may be understood as being similar to the transmission module 610 and the reception module 620 of the media player 130, and thus a detailed description thereof will be omitted.

The DRM module 730 controls generation, processing and interpretation of a message for digital rights management. For example, the DRM module 730 may control the home network domain admission process described above with reference to FIG. 2. In addition, the DRM module 730 may be responsible for security of a home network domain. According to an exemplary embodiment of the present invention, the DRM module 730 may include an encryption/decryption module (not shown) and a security storage module (not shown).

The encryption/decryption module may perform encryption and decryption operations required to protect a domain rights object in a home network domain. The encryption/decryption module may use at least one of the public-key cryptography, such as the Diffie-Hellman algorithm, the RSA algorithm, the ElGamal algorithm or the elliptic curve algorithm, and the symmetric-key cryptography such as the DES algorithm or the AES algorithm.

The security storage module stores data that requires security, such as a rights object, a domain key, and a private key of the public-key cryptography. The security storage module may be logically or physically protected from access by an external device.

Referring back to FIG. 7, the rights object management module 740 provides a rights object to the media player 130. Desirably, but not necessarily, the rights object management module 740 may generate and interpret a UPnP AV protocol-based message. For example, the rights object management module 740 may process the UPnP CDS-based actions illustrated in FIGS. 5A through 5I. In addition, the rights object management module 740 may manage UPnP CDS-based objects. For example, if a new rights object is stored, the rights object management module 740 may allocate an object ID to the rights object or generate a rights object expression object corresponding to the rights object.

If the media server 120 is a UPnP AV compatible device, it may further include a control module (not shown) processing a UPnP-based operation (such as discovery or advertising). The control module may be integrated into the rights object management module 740.

Operations performed between components of the media player 130 and the media server 120 described above with reference to FIGS. 6 and 7 may be more specifically understood with reference to descriptions of FIGS. 1 through 5C.

As described above, a DRM apparatus and method according to the exemplary embodiments of the present invention uses a UPnP technology to enable an external DRM system and a system within a home network to be compatible with each other. Therefore, even when a rights object stored in a media player disappears, the media player can obtain the rights object again from a media server and use content.

Each component of the media player 130 and the media server 120 described above with reference to FIGS. 6 and 7 may be implemented as a module. The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A digital rights management (DRM) method comprising:
generating, by a media player, a rights object request message for requesting a rights object corresponding to first content stored in the media player and transmitting the rights object request message;
receiving a rights object response message including at least one of the rights object and a uniform resource identifier (URI) of the rights object; and
obtaining a rights object using the rights object response message,
wherein the first content comprises metadata, which is a content identifier (ID) given by a DRM system or a rights object identifier (ID) provided by a media server,
wherein the media server searches the rights object corresponding to the first content by referring to at least one of the content ID and the rights object ID of metadata, and
wherein the generating and transmitting of the rights object request message comprises:
searching for the media server, which has the rights object corresponding to the rights object request message, using a universal plug and play (UPnP) content directory service (CDS)-based action included in the rights object request message by the media player; and
transmitting the rights object request message from the media player to the media server.

2. A digital rights management (DRM) method comprising:
generating, by a media player, a rights object request message for requesting a rights object corresponding to first content stored in the media player and transmitting the rights object request message;
receiving a rights object response message including at least one of the rights object and a uniform resource identifier (URI) of the rights object; and
obtaining a rights object using the rights object response message,
wherein the generating and transmitting the rights object request message comprises generating the rights object request message using a search action,
wherein the search action comprises a search variable and searches metadata using the search variable,
wherein the first content comprises the metadata, which is a content identifier (ID) given by a DRM system, wherein a media server searches the rights object corresponding to the first content by referring to at least one of the content ID and rights object ID of metadata,
wherein the rights object request message comprises the search action, and
wherein the generating and transmitting of the rights object request message comprises:
searching for the media server, which has the rights object corresponding to the rights object request message, using a universal plug and play (UPnP) content directory service (CDS)-based action included in the rights object request message by the media player; and
transmitting the rights object request message from the media player to the media server.

3. A digital rights management (DRM) apparatus comprising:
a processor;
a DRM module, executed by the processor, that generates a rights object request message; and
a rights object search module that searches for a rights object which corresponds to the rights object request message,
wherein the rights object request message is transmitted to a media server,
wherein a rights object response message including at least one of the rights object and a uniform resource identifier (URI) of the rights object is received from the media server,
wherein first content stored in the DRM apparatus is played back using the rights object response message,
wherein the first content comprises metadata, which is a content identifier (ID) given by a DRM system or a rights object identifier (ID) provided by the media server,
wherein the media server searches the rights object corresponding to the rights object request message by referring to at least one of the content ID and the rights object ID of metadata, and
wherein the rights object search module searches for the media serve, which has the rights object corresponding to the rights object request message, using a universal plug and play (UPnP) content directory service (CDS)-based action included in the rights object request message and transmits the rights object request message to the media server.

4. The apparatus of claim 3, wherein the rights object request message comprises metadata which is the object ID.

5. The apparatus of claim 3, wherein the rights object search module in the DRM apparatus searches for the media server, which has the rights object corresponding to the rights object request message, using the metadata included in the rights object request message and transmits the rights object request message to the media server.

6. The apparatus of claim 3, wherein the rights object request message comprises the metadata which is the content ID.

7. The apparatus of claim 6, wherein the rights object search module in the DRM apparatus searches for the media server, which has the rights object corresponding to the rights object request message, using the metadata included in the rights object request message and transmits the rights object request message to the media server.

8. A digital rights management (DRM) apparatus comprising:
   a processor;
   a DRM module, executed by the processor, that generates a rights object request message; and
   a rights object search module that searches for a rights object which corresponds to the rights object request message,
   wherein the rights object request message is transmitted to a media server,
   wherein a rights object response message including at least one of the rights object and a uniform resource identifier (URI) of the rights object is received from the media server,
   wherein first content stored in the DRM apparatus is played back using the rights object response message,
   wherein the DRM module generates the rights object request message using a search action, wherein the search action comprises a search variable and searches metadata using the search variable,
   wherein the first content comprises the metadata, which is a content identifier (ID) given by a DRM system, wherein the rights object corresponding to the rights object request message is searched by referring to at least one of the content ID and rights object ID of metadata,
   wherein the rights object request message comprises the search action, and
   wherein the rights object search module searches for the media server, which has the rights object corresponding to the rights object request message, using a universal plug and play (UPnP) content directory service (CDS)-based action included in the rights object request message and transmits the rights object request message to the media server.

* * * * *